United States Patent [19]

Dereppe et al.

[11] 4,144,304

[45] Mar. 13, 1979

[54] PROCESS FOR THE MANUFACTURE OF SHEETS FROM A MIXTURE OF VEGETABLE FIBRES AND POLYOLEFINE

[75] Inventors: Michel Dereppe, Brussels; Antoine Deryckere, Sint-Pieters-Leeuw, both of Belgium

[73] Assignee: Solvay & Cie, Brussels, Belgium

[21] Appl. No.: 713,482

[22] Filed: Aug. 11, 1976

[30] Foreign Application Priority Data

Aug. 29, 1975 [LU] Luxembourg ............................ 73279

[51] Int. Cl.² .............................................. B29D 7/14
[52] U.S. Cl. ................................. 264/175; 260/17.4 R
[58] Field of Search ........................ 260/17 R, 17.4 R; 264/175

[56] References Cited

U.S. PATENT DOCUMENTS

| | | | |
|---|---|---|---|
| 2,586,820 | 2/1952 | Hemperly | 264/175 |
| 3,328,503 | 6/1967 | Ancker | 264/175 |
| 3,962,157 | 6/1976 | Nakano | 260/17.4 R |
| 3,981,840 | 9/1976 | Yamamoto | 260/42 |

FOREIGN PATENT DOCUMENTS 1044503 10/1966 United Kingdom.

OTHER PUBLICATIONS

Modern Plastics Encyclopedia for 1974–1975, vol. 51, No. 10A, Oct. 1974, pp. 213, 214, 222.

*Primary Examiner*—Paul R. Michl
*Attorney, Agent, or Firm*—Spencer & Kaye

[57] ABSTRACT

Manufacture of sheets having a high resistance to water absorption by hot calendering of a mixture produced from 25 to 75% by weight of vegetable fibres and from 75 to 25% by weight of molten polyolefine. As unexpected, such a mixture does not stick to the calender rolls during the sheeting step.

8 Claims, 1 Drawing Figure

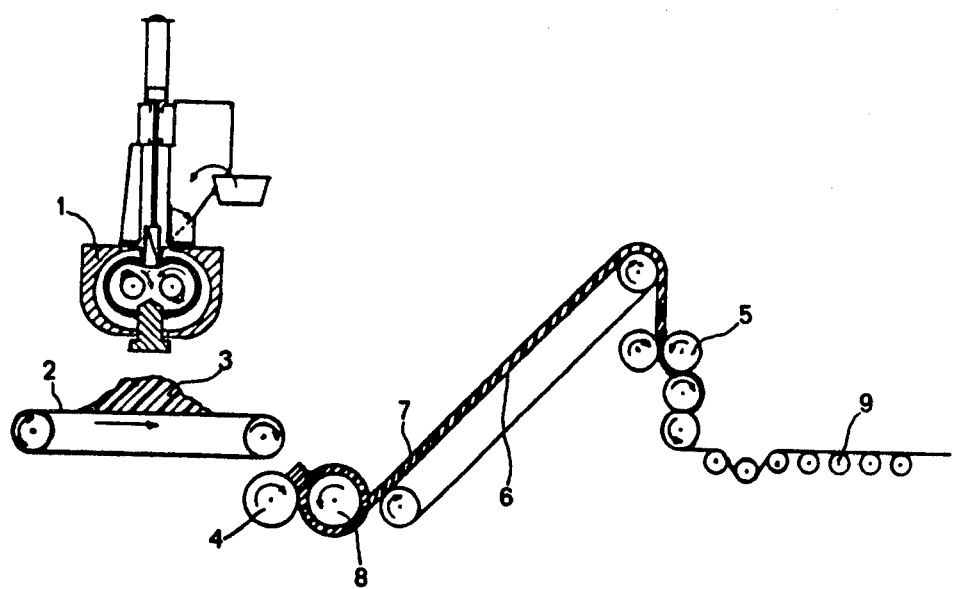

PROCESS FOR THE MANUFACTURE OF SHEETS FROM A MIXTURE OF VEGETABLE FIBRES AND POLYOLEFINE

The present invention relates to a process for the manufacture of sheets from a mixture of vegetable fibres and polyolefine, which sheets in particular have increased resistance to water absorption.

From French Pat. Application No. 2,200,112 filed on 19.9.1973 in the name of H. BRAUNING, a process is already known for the production of semi-finished products from particles of wood and a plastic such as polyvinyl chloride, in which a mixture of these constituents is introduced into an extrusion device and delivered in the form of a thick strand which is pressed in a cooled press in order to give it the desired shape.

German Pat. Application No. 2,042,176 filed on 25.8.1970 in the name of SHOWA MARUTSUTSU CO. describes a similar process in which the extrudate is directly brought to its final shape by means of a suitable die such as, for example, a sheet die.

These known processes exhibit major disadvantages and limitations.

Thus, they require resorting to extrusion installations which have been specially designed and proved with degassing systems in order to make it possible to remove the water vapour evolved by the vegetable fibres during the extrusion process. Furthermore, it is important that the moisture content of the vegetable fibres employed should not exceed a limiting value beyond which working on an extruder becomes impossible. Regardless of the moisture content of the vegetable fibres, the setting up of the extrusion conditions is always a delicate operation, especially when the product is brought to its final shape by passing through a profiling die.

Furthermore, it is necessary judiciously to choose the nature of the fibres or wood particles incorporated into the sheets and especially to avoid resorting to resinous vegetable fibres which cause problems during extrusion.

Finally, the products obtained generally have insufficient resistance to water absorption. This results in a severe deterioration in the mechanical properties when these products are used in damp media.

The Applicant Company has now developed a process which no longer exhibits the abovementioned disadvantages of the known processes and which makes it possible to produce panels, based on vegetable fibres and polyolefines, which possess improved resistance to water absorption.

Accordingly, the present invention relates to a process for the production of sheets which have a high resistance to water absorption, from a mixture of vegetable fibres and polyolefine, by producing a homogeneous mixture from 25 to 75% by weight of vegetable fibres and from 75 to 25% by weight of molten polyolefine and sheeting this mixture by hot calendering at a temperature at least equal to the melting point of the polyolefine.

The fact that it is possible to convert such a mixture to a sheet by hot calendering is surprising because it is well known that the molten polyolefines in no way lend themselves to this sheeting technique. In fact, it is known that these resins stick to the calendering rolls as soon as the temperature of the latter reaches or exceeds the melting point of the resin.

The homogeneous mixture of vegetable fibres and molten polyolefine can be produced by any known means and in particular by introducing these constituents in metered amounts into a plunger-type internal mixer such as, for example, a Werner mixer or a Banbury mixer.

According to a preferred embodiment, the mixture of vegetable fibres and molten polyolefine produced by means of an internal mixer is received on a roll-type external mixer which converts the successive charges of mixture, delivered by the internal mixer, to a continuous strip from this roll duced into the calendering installation via a conveyor belt. Hence it is possible to produce sheets continuously in spite of the discontinuous operation of the internal mixers.

The Applicant Company has furthermore found that if different speeds of rotation are imparted to the rolls of the external mixer, the treated mixture wraps itself around the roll having the higher speed of rotation and that the removal of a continuous strip from this roll does not present any problem.

This technique of production of the mixture of vegetable fibres and molten polyolefine furthermore has the advantage of making it possible to employ vegetable fibres which have a high moisture content, because the evolution of water vapour during the treatment in the internal mixer or on the external mixer can take place freely and without interfering with the sheeting process, since the latter is carried out during the subsequent calendering. Finally, this technique makes it possible to employ resinous vegetable fibres.

According to another variant, the homogeneous mixture of vegetable fibres and molten polyolefine can be produced by extrusion, in which case the mixture is delivered in the form of a thick strand of any cross-section, which is introduced continuously into the hot calendering installation where the sheeting operation is carried out.

On operating in this latter manner, the disadvantages inherent in the presence of water in the vegetable fibres are obviously encountered again, but to a much lesser degree because this presence of water no longer presents the danger of making the sheeting operation difficult, as this latter operation is separate from the extrusion. Hence, the carrying out of the extrusion is made very much easier because the operator does not have to worry about the appearance of the extruded thick strand.

Regardless of the particular embodiment of the first stage of the process according to the invention, the homogeneous mixture of vegetable fibres and molten polyolefine should be produced in apparatuses which raise this mixture to a temperature at least equal to, and preferably above, the melting point of the polyolefine. Obviously, the temperature must be below the decomposition temperature of any constituent of the mixture. It is preferably at least 2° C. above the melting point of the polyolefine.

The design of the hot calendering installation which performs the sheeting of the mixture is in no way critical. The Applicant Company prefers calenders with four heated rolls arranged in a L, but installations of another type can equally be suitable. However, it is important that at least the first two, and preferably all, the rolls should be heated so as to keep their surface, and hence the calendering temperature, at a temperature above the melting point of the polyolefine during the sheeting operation. Preferably, the temperature of the rolls is within the range defined by the melting point of the polyolefine plus 2° C., and this temperature plus 20° C. The calendering installation is obviously followed by a cooling train, which ensures the solidification of the hot calendered sheet.

The process according to the invention permits the production of thin sheets, the thickness of which is generally greater than 0.2 mm and can be up to 4 mm and even more.

It is particularly suitable for the manufacture of sheets of thickness of about 0.6 to 3 mm. It is impossible to produce sheets of 0.6 mm thickness in large widths by the known processes.

Finally, the process according to the invention permits the production of sheets of good quality from mixtures which contain a preponderant proportion by weight of vegetable fibres, and lends itself, without problems, to the recycling of the scrap, whilst this is not possible with the known processes.

The polyolefine employed in the process according to the invention can be any polymer containing a majority of monomeric units derived from an olefine possessing from 2 to 8 carbon atoms in their molecule. By way of example, there may be mentioned low density or high density polyethylene, polypropylene, copolymers of ethylene and propylene, poly-1butene, poly-4-methyl-1-pentene, the copolymers of ethylene and of propylene, the vinyl acetate/ethylene copolymers and the ethylene/vinyl chloride copolymers.

Preferably, polyolefines are used whereof all the units are derived from unsubstituted olefines possessing 2 to 8 carbon atoms in their molecule. The best results are obtained with the polymers containing at least 70%, preferably at least 90%, of units derived from propylene in their molecule. Of course, it is also possible to use mixtures of polyolefines which one another or with other polymers. In this latter case, it is however preferred that there should be at least 50% by weight, preferably at least 75% by weight, of polyolefines in the mixture. If several polyolefines are employed, the calendering temperature must be at least equal to the melting point of the polyolefine having the lowest melting point. Preferably, it is at least equal to the melting point of the polyolefine having the highest melting point.

If the preferred embodiment, in which propylene polymers are employed, is used, the calendering temperature is preferably chosen between 172° C., and 190° C.

The polyolefine can be used in any form which allows it to be mixed with the vegetable fibres. Preferably, it is free from coarse particles. Thus, the resin can be in the form of a powder, of flakes, of particles, of fibrids, of fibres or of fibre scrap and the like.

The polyolefine can advantageously contain usual additives such as stabilisers, lubricants, anti-static agents or fungicides, and the like. It can furthermore contain pigments, dyestuffs, fillers and the like.

The vegetable fibres can also be whatever may be desired and are preferably in the form of particles having a mean size of between 0.1 and 3 mm. These particles can in particular be wood flour or sawdust, chopped straw, textile fibres and the like, with the possibility of employing fibres originating from resinous wood, such as pine sawdust or eucalyptus sawdust, being in no way excluded.

The Applicant Company has found that the technique of sheeting by hot calendering in accordance with the invention leads to products having an improved surface appearance: at the surface, the sheets have a fine continuous and smooth skin of polyolefine.

Furthermore, the sheets manufactured by means of the process according to the invention have very good resistance to water absorption when they are placed in a moist atmosphere. For this reason, they preserve excellent mechanical properties and especially excellent flexural strength even when the degree of relative humidity of the atmosphere is high.

These sheets can be used in numerous applications for which they can be brought to their final shape by thermoforming. They can also be coated, for example before thermoforming, with a decorative skin in order to improve their appearance. They are employed, for example, for the manufacture of dashboards or door linings in the automobile industry.

The process according to the invention is furthermore illustrated by the practical embodiment which now follows. Of course, the latter does not in any way limit the scope and spirit of the invention.

To carry out this example, the apparatus shown schematically in the single FIGURE of the attached drawing was used, which comprises a plunger-type internal mixer 1, a conveyor belt 2 which transfers the charges 3 delivered by the internal mixer to the rolls of an external mixer 4, a calendering installation with four heated rolls arranged in a L, 5, a conveyor 6 which transfers the strip 7 taken from a roll 8 of the external mixer into the first nip of the calendering installation, and a cooling train 9.

EXAMPLE 5.1 kg of a composition comprising, in parts by weight, 500 parts of polypropylene, 500 parts of wood flour (mean size 0.4 mm), 0.5 part of calcium stearate, 0.5 part of 2,6-di-tert.-butyl-4-methylphenol and 0.5 part of glycerol monostearate are introduced in successive charges into the internal mixer 1 of FIG. 1.

The internal mixer (of the Werner and Pfleiderer GK5 type) is preheated to 170° C., and the mixing cycle is 90 seconds; the work is from 40 to 50 kg.m. The charges delivered by the internal mixer are received on the rolls of a Berstorff external mixer heated to 175° C. On roll 8, a 5 cm wide strip is taken off and is transferred into, and spread in, the first nip of the calendering installation. The successive rolls of the calendering installation are respectively kept at 185°, 182°, 183° and 172° C. The sheet issuing from the last calendering roll has a uniform thickness of 1.5 mm and its surface appearance after cooling and solidification on the cooling train 9 is excellent.

A sample of the sheet is subjected to a flexural strength test and it is found that the said strength amounts to 380 kg/cm$^2$.

A sample of size 100 mm × 100 mm is cut from the sheet and is subjected to the following test.

After having coated the cut edges of the sample by means of paraffin, the sample is weighed and is then immersed in water, kept at 23° C., for 24 hours. After this period of time, the sample is withdrawn, blotted by means of a filter paper, taking care not to remove the paraffin, and again weighed. The difference in the weight before and after immersion, relative to the weight before immersion, gives the per cent absorption of water.

It is found that this percentage amounts to 4% for the sample examined.

A fresh flexural strength test is carried out on the sample which has been subjected to the water absorption test and it is found that the said strength is still 380 kg/cm$^2$.

By way of comparison, a sheet was produced with the utmost care from the same composition by the extrusion technique, employing a sheet die.

During the water absorption test, it is found that the percentage amounts to 8%. Furthermore, it is found that the flexural strength of the sheet after immersion is no more than 75% of the flexural strength of the sample not subjected to the immersion test.

We claim:

1. Process for the manufacture of sheets having a high resistance to water absorption, from a mixture of vegetable fibres and polyolefine, where a homogenous mixture is produced from 25 to 75% by weight of vegetable fibres and from 75 to 25% by weight of molten polyolefine and in that this mixture is sheeted by hot calendering at a temperature at least equal to the melting point of the polyolefine, the hot calendering being carried out on a calender having a plurality of rolls all of which are heated at the surface to a temperature above the melting point of the polyolefine.

2. Process according to claim 1, wherein the homogeneous mixture of vegetable fibres and of molten polyolefine is produced in a plunger-type internal mixer, by introducing these constituents in metered amounts.

3. Process according to claim 2, wherein the homogeneous mixture of vegetable fibres and of molten polyolefine issuing from the plunger-type internal mixer is received on a roll-type external mixer which converts the successive charges of mixture, delivered by the internal mixer, to a continuous strip which is introduced into a hot calendering installation.

4. Process according to claim 1, wherein the homogeneous mixture of vegetable fibres and of molten polyolefine is produced by extrusion and is extruded in the form of a thick strand which is sheeted by hot calendering.

5. Process according to claim 1, wherein the homogeneous mixture of vegetable fibres and of molten polyolefine is heated, before calendering, to a temperature at least equal to the melting point of the polyolefine.

6. Process according to claim 1, wherein the two first rolls of the calender are heated at the surface to a temperature between the melting point of the polyolefine plus 2°C., and the said melting point plus 20°C.

7. Process according to claim 1, wherein vegetable fibres which are in the form of particles having a mean size of between 0.1 and 3 mm and a polyolefine which only contains monomeric units derived from an olefine containing from 2 to 8 carbon atoms in its molecule are employed.

8. Process according to claim 1, wherein a polyolefine containing at least 70% of propylene in its molecule is employed and the calendering temperature is chosen between 172° and 190° C.

* * * * *